United States Patent [19]
Langendorf

[11] Patent Number: 5,548,767
[45] Date of Patent: Aug. 20, 1996

[54] METHOD AND APPARATUS FOR STREAMLINED HANDSHAKING BETWEEN STATE MACHINES

[75] Inventor: Brian K. Langendorf, El Dorado Hills, Calif.

[73] Assignee: Intel Corporation, Santa Clara, Calif.

[21] Appl. No.: 132,521

[22] Filed: Oct. 6, 1993

[51] Int. Cl.⁶ .............................. G06F 9/40; G06F 13/14
[52] U.S. Cl. .................... 395/775; 395/650; 364/977.5; 364/DIG. 2
[58] Field of Search .................................. 395/775, 650, 395/725, 325, 800, 275

[56] References Cited

U.S. PATENT DOCUMENTS

| | | | |
|---|---|---|---|
| 4,376,982 | 3/1983 | Bantz et al. | 395/325 |
| 4,819,151 | 4/1989 | May | 395/650 |
| 5,101,479 | 3/1992 | Baker et al. | 395/325 |
| 5,179,705 | 1/1993 | Kent | 395/725 |
| 5,265,212 | 11/1993 | Bruce, II | 395/325 |
| 5,404,535 | 4/1995 | Barlow et al. | 395/725 |

Primary Examiner—Gopal C. Ray
Attorney, Agent, or Firm—Blakely, Sokoloff, Taylor & Zafman

[57] ABSTRACT

A method and apparatus for streamlined handshaking between state machines. Under the handshake protocol of the present invention, an initiator state machine sends a request for execution of a task to a target state machine. The target state machine sends an ARM signal to the initiator state machine. When high, the ARM signal indicates to the initiator that the target state machine will begin executing a requested task at the beginning of the next clock cycle. When low, the ARM signal indicates to the initiator that the target state machine will not execute a requested task.

15 Claims, 5 Drawing Sheets

5,548,767

METHOD AND APPARATUS FOR STREAMLINED HANDSHAKING BETWEEN STATE MACHINES

BACKGROUND OF THE INVENTION

1. Field of the Invention

The present invention relates generally to electronic state machines and more specifically to handshake protocols for electronic state machines.

2. Prior Art

State machines are functional blocks of logic designed to perform specific functions based on the values of input signals. For example, a microcontroller may contain a bus controller state machine and a cache controller state machine. Based on input signals provided by the microcontroller, the bus controller either stores or fetches data from external memory; the cache controller checks for copies of data requested from external memory and stores copies of data as external memory is changed. Upon beginning a fetch from a cacheable region of external memory, the bus controller requests that the cache controller determine if a copy of the desired data is stored in the on-chip cache memory. The cache controller determines if the copy is present and indicates the finding to the bus controller. In this manner the bus controller and cache controller state machines cooperate through handshaking to perform some of the overall functions of the microcontroller.

FIG. 1a illustrates a common request and acknowledge handshake protocol that allows an initiator state machine to request execution of one of two tasks by a target state machine, and also allows the target state machine to indicate to the initiator state machine the start of execution of the requested task. The initiator requests that the target execute either a first or a second task by driving either the REQ1 or REQ2 signal high, respectively. When the target is ready to accept a request the target determines which request is active and drives the ACK (acknowledge) signal high in the following clock cycle to indicate the start of execution of the requested task.

This prior art request/acknowledge handshake protocol presents two problems illustrated by the first and second REQ/ACK combinations shown in the waveforms of FIG. 1b.

First, there is a minimum delay of two clocks after a first task is requested before the initiator can initiate another event that is gated by the start of execution of the first task by the target. Suppose that the initiator needs to initiate the execution of a second task but cannot do so until the initiator knows that the target has started executing an earlier requested first task, i.e. the first task gates the second task. The earliest that the target can initiate the second task is two clock cycles after requesting execution of the first task by the target. This is the case where the target is ready and waiting to execute the first task. For example, as shown in the first REQ1/ACK combination in the waveforms of FIG. 1b, suppose the initiator drives the REQ1 signal high at the beginning of a first clock cycle. If the target is waiting to execute a request, the target will determine which request to service during the first clock cycle and drive the ACK signal high at the beginning of the next, or second, clock cycle to indicate to the initiator that execution of the request is started. The initiator, which is waiting for an indication that the target has started execution, receives the ACK signal going high during the second clock cycle and initiates the second task at the start of the following, or third, clock cycle, two clock cycles after the original request.

Second, in cases of changing multiple requests there is an ambiguity as to which request is acknowledged by the target when the ACK signal is driven high. Resolving the ambiguity requires extra logic. For example, as shown in the second pair of REQ/ACK events in the waveforms of FIG. 1b, suppose the initiator initially drives the REQ1 signal high to request a first task, but later changes and drives the REQ1 signal low and the REQ2 signal high to indicate a new request of a second task (only one request signal can be high at a time). Also suppose that at the time the change in requests occurs, the target drives the ACK signal high acknowledging a request. Is the target acknowledging the REQ1 request that was high during the previous cycle or the REQ2 request that is currently high? Since the target must decide which request to service during the cycle before driving the ACK signal high, the request corresponding to REQ1 is being acknowledged in this case. To resolve this ambiguity, the initiator must remember the previous state of all of the request signals to understand which request is being acknowledged by a given ACK signal going high. This is typically accomplished by storing the previous state of all REQ signals (i.e. their state during the previous clock cycle) in latches.

The two clock cycle minimum delay problem imposes a performance penalty on the overall function performed by two handshaking state machines. In the case of microprocessors or computer systems, the performance penalty degrades overall microprocessor and computer system performance. The changing request ambiguity problem requires extra logic for each request signal and becomes significant as the number of request signals between state machines increases.

Therefore, a method and apparatus for streamlined handshaking between state machines is needed.

SUMMARY OF THE INVENTION

The present invention is drawn to a method and apparatus for streamlined handshaking between state machines. The present invention also includes the implementation of streamlined handshaking in a computer system.

The streamlined handshake apparatus of the present invention includes an initiator unit and a target unit. In a first embodiment the initiator unit generates a first signal for communicating a first request. The initiator unit also receives a second signal. The target unit receives the first signal and a clock signal and selectively executes a first task in response to the first request. The target unit also generates the second signal. When the second signal has a first value it indicates to the initiator unit that the target unit will begin executing the first task a predetermined number of clock cycles after receiving the first request. When the second signal has a second value it indicates that the target unit will not execute the first request.

In a second embodiment, the initiator unit generates a plurality of request signals for communicating a corresponding plurality of requests. The initiator unit sends only one active request at a time. The initiator unit also receives a second signal. The target unit receives the request signals and a clock signal and selectively executes the requests. The target unit also generates the second signal. When the second signal has a first value it indicates to the initiator that the target unit will begin executing the active request a predetermined number of cycles of the clock signal after receiving the active request. When the second signal has a second value it indicates that the target unit will not execute the active request.

BRIEF DESCRIPTION OF THE DRAWINGS

FIG. 1b illustrates the waveform for the prior art request/acknowledge handshake protocol in FIG. 1a.

DETAILED DESCRIPTION OF THE INVENTION

A method and apparatus for streamlined handshaking between state machines is described. An implementation of the apparatus in a computer system is also described. In the following description, numerous specific details are set forth in order to provide a thorough understanding of the present invention. It will be apparent, however, to one skilled in the art that the present invention may be practiced without these specific details. In other instances, well known methods and circuits are shown in block diagram form in order not to obscure the present invention unnecessarily.

It should be understood that the present invention is comprised of transistor circuits that are readily manufacturable using well known complementary metal-oxide semiconductor (CMOS) technology, or other semiconductor manufacturing processes.

The present invention solves two problems associated with the state machine handshaking protocols of the prior art: the two clock cycle minimum delay problem and the ambiguity in acknowledging changing requests problem.

Figure 1A:
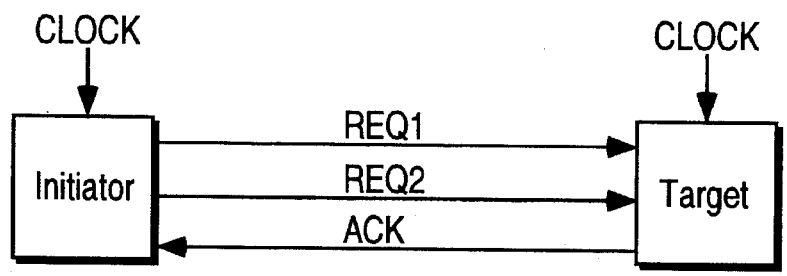
FIG. 1a illustrates a prior art request/acknowledge handshake protocol for state machines.
Figure 1B:
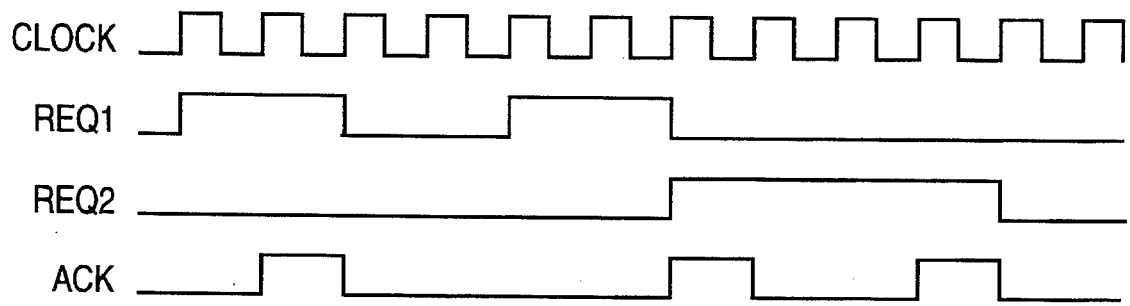
Figure 2A:
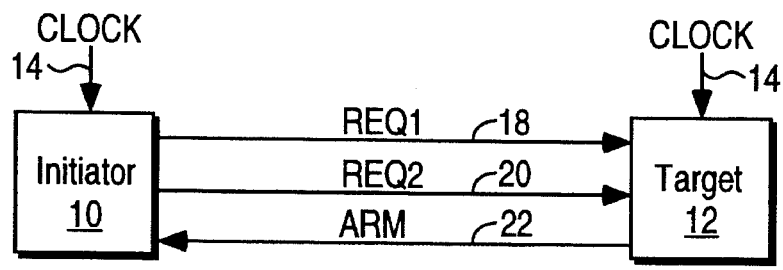
FIG. 2a is a block diagram of the apparatus of the present invention for the streamlined handshaking protocol.
Figure 2B:
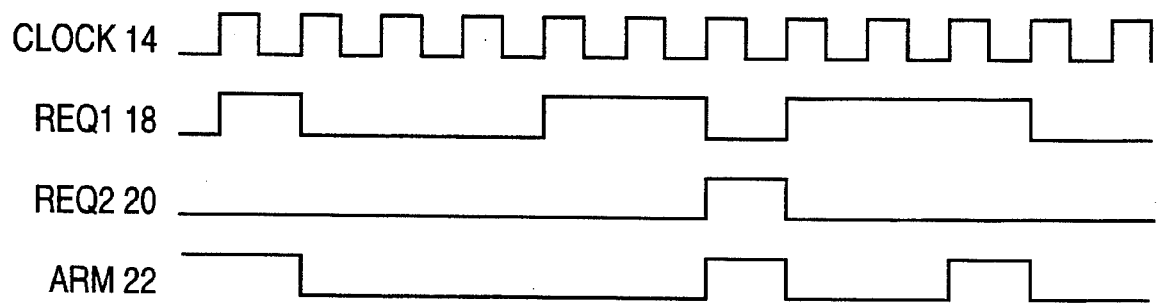
FIG. 2b illustrates the waveforms of one embodiment of the present invention for the streamlined handshaking protocol.

FIG. 2a is a block diagram of the streamlined handshaking protocol apparatus of the present invention and FIG. 2b illustrates the waveforms of the apparatus in FIG. 2a. The apparatus of the present invention includes an initiator state machine 10 coupled to a target state machine 12. The initiator state machine 10 and target state machine 12 could each be a microprocessor, a microcontroller, a programmable logic device, a purely combinational logic device, or some combination of these elements. The initiator 10 and the target 12 each receive a clock signal 14. A cycle of the clock signal 14 is the time between consecutive rising edges. Each state machine causes events to occur on the rising edges of the clock signal 14. The initiator 10 generates a REQ1 signal 18 and a REQ2 signal 20 for communicating requests for the execution of first and second tasks, respectively, to the target 12. A high level on a request signal indicates a request for execution of the task that corresponds to that signal. A low level indicates no request. Only one request signal is driven high at a time. The target 12 generates an ARM signal 22 for communicating to the initiator 10 whether the target 12 is currently accepting requests. If the ARM signal 22 is high, indicating that the target 12 is accepting requests, and the initiator 10 indicates a request on either the REQ1 signal 18 or the REQ2 signal 20 signal, the target 12 will start executing the requested task at the beginning of the next clock cycle. Essentially the ARM signal 22 being high tells the initiator 10 that the target 12 will start a requested task at the beginning of the next clock cycle after the request is received. The ARM signal 22 being low indicates that the target 12 will not accept a request.

Improving on the prior art minimum delay of two clock cycles, the present invention reduces to one clock cycle the minimum delay between the time that the initiator requests execution of a first task by the target and the time that the initiator can initiate a second task that is gated by the start of execution of the first task. An example is shown in the waveforms of FIG. 2a by the first request on the REQ1 signal 18. The ARM signal 22 is already high, meaning that the target 12 is ready to accept a request, when the first request on the REQ1 signal 18 occurs. Since the ARM signal 22 is high when the initiator 10 drives the REQ1 signal 18 high, the initiator 10 knows that the target 12 will begin executing the request at the beginning of the next cycle. Because the initiator 10 knows that the target 12 will start executing the first request at the beginning of the next clock cycle, the initiator 10 can initiate a second request that is gated by the first request at the start of that same clock cycle. After accepting the first request, the target 12 drives the ARM signal 22 low to indicate that requests are no longer being accepted. The initiator 10 drives the REQ1 signal 18 low to remove the first request. This example shows that if the ARM signal 22 is high when a request is sent, the initiator 10 knows that the target 12 will start executing the request on the next clock cycle. Therefore, the present invention reduces the minimum delay between gated events to one clock cycle.

The present invention also removes the requirement that the initiator latch the state of the request signals during the previous clock cycle to remove ambiguity as to which request is being accepted by the target. An example of this is shown in the waveforms of FIG. 2b by the second and third set of REQ/ARM events. Initially, the initiator 10 sends a first request by driving the REQ1 signal 18 high while the REQ2 signal 20 and the ARM signal 22 are low. Two clock cycles later the initiator 10 removes the first request by driving the REQ1 signal 18 low and at the same time issues a second request by driving the REQ2 signal 20 high. Also at this time, the target 12 drives the ARM signal 22 high indicating that the target 12 is accepting requests. There is no ambiguity on the part of the initiator 10 as to which request is accepted by the target because the target 12 always accepts the request that is high during the clock cycle when the ARM signal 22 is driven high. The initiator 10 knows that because the REQ2 signal 20 was high during the clock cycle when the ARM signal 22 went high that the second request is the one that was accepted by the target 12. The target 12 drives the ARM signal 22 low one cycle later to indicate that the target 12 is no longer accepting requests. Also at this time, the initiator 10 removes the second request by driving the REQ2 signal 20 low and renews the first request by driving the REQ1 signal 18 high. Two clock cycles later, the target 12 completes the second request and drives the ARM signal 22 high to indicate that the target 12 is accepting requests. Since the REQ1 signal 18 is high during the clock cycle when the ARM signal 22 goes high, the target starts execution of the first request one cycle later and drives the ARM signal 22 low to indicate that the target is no longer accepting requests. This example illustrates that under the handshake protocol of the present invention there is no ambiguity as to which request is accepted by the target. Therefore, under the protocol of the present invention there is no need for the initiator to have latches on each REQ signal to remember the state of the request signals in the previous clock cycle.

In its overall operation the present invention provides a streamlined handshake protocol between an initiator state machine and a target state machine. The method of operation of each state machine will now be described.

Figure 3:
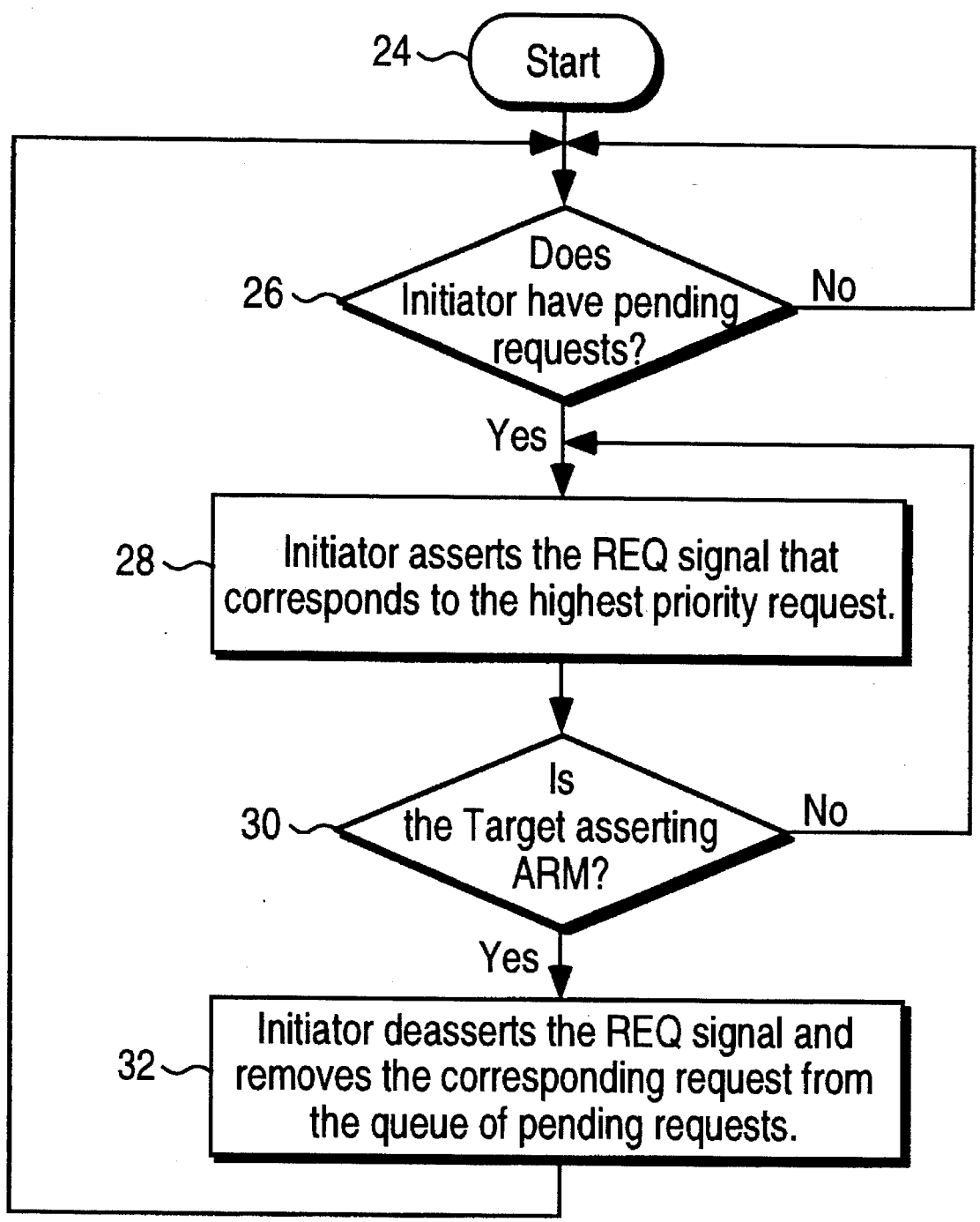
FIG. 3 is a flowchart of the method of the initiator state machine of the present invention.

FIG. 3 is a flowchart of the method of the initiator state machine of the present invention. The method begins in step 24. In step 26, the initiator 10 determines whether the initiator has any pending request (in a request queue) to be executed by the target 12. If there are no pending requests then the method remains in step 26 to continue checking for pending requests. If there are pending request(s), then the method proceeds to step 28 where the initiator 10 asserts (drives high) the REQ signal corresponding to the highest priority request in order to communicate the request to the target 12. (The initiator 10 has logic that determines the priority of the pending requests.) After step 28, the method proceeds to step 30 where the initiator 10 determines whether the target 12 is asserting the ARM signal 22. The ARM signal 22 being asserted (i.e. being high) indicates to the initiator 10 that the target 12 is accepting requests; the ARM signal 22 not being asserted (i.e. being low) indicates to the initiator 10 that the target 12 is not accepting requests. If the ARM signal 22 is not asserted then the method branches to step 28. If the ARM signal 22 is asserted then the method proceeds to step 32 where the initiator 10 deasserts (drives low) the REQ signal and removes the corresponding request from a queue of pending requests because the initiator 10 knows that if the ARM signal 22 is asserted the target 12 will accept the request and begin executing the request at the beginning of the next clock cycle. After step 32 the method branches to step 26 to repeat the process.

Figure 4:
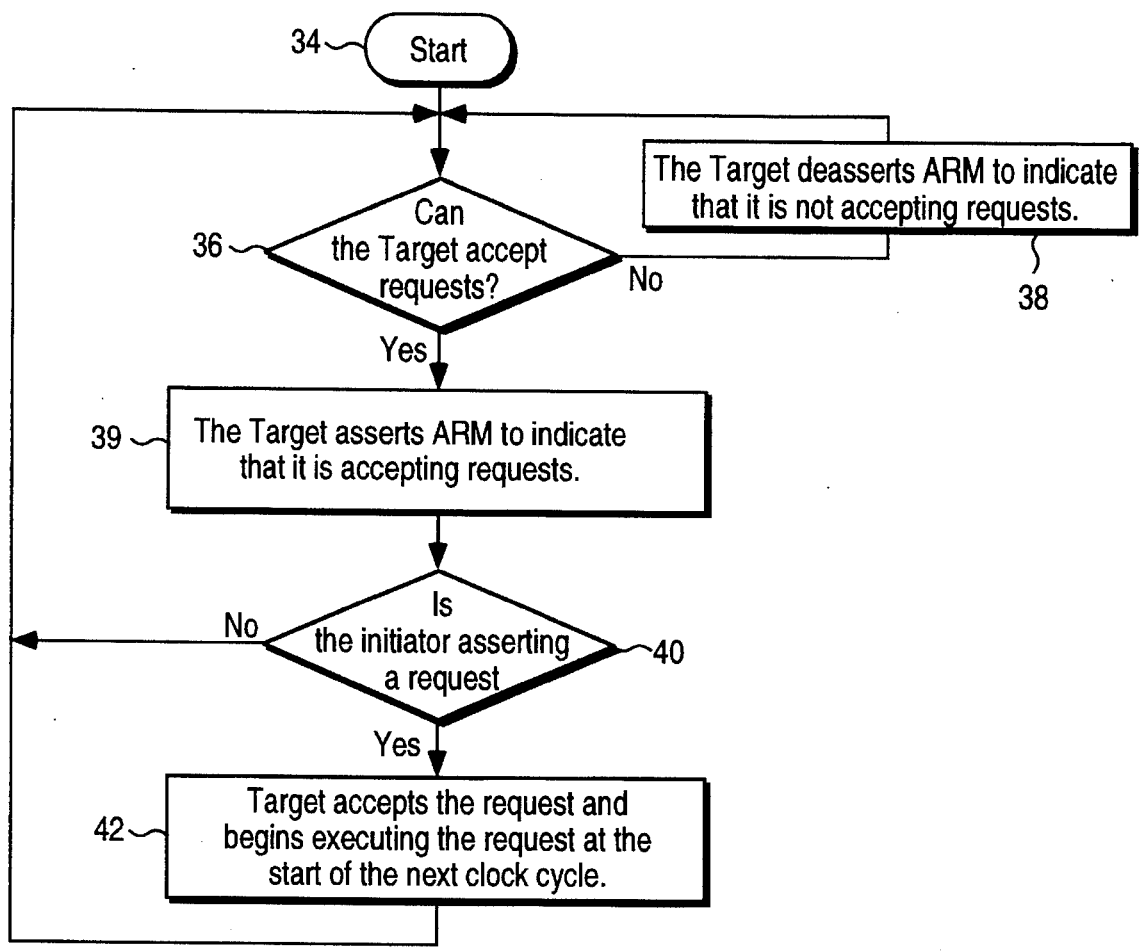
FIG. 4 is a flowchart of the method of the target state machine of the present invention.

FIG. 4 is a flowchart of the method of the target state machine of the present invention. The method begins in step 34. In step 36, the target 12 determines whether it can accept requests. In one embodiment the target 12 can only accept requests when it is not currently servicing a request. In another embodiment the target 12 has a requests queue and can accept requests until the queue is full. If the target 12 cannot accept requests in step 36, then the method proceeds to step 38 where the ARM signal 22 is deasserted (driven low) to indicate to the initiator 10 that the target 12 is not accepting requests. After deasserting the ARM signal 22 in step 38, the method branches back to step 36. If the target 12 can accept requests in step 36, then the method proceeds to step 39 where the ARM signal 22 is asserted (driven high) to indicate to the initiator 10 that the target 12 is accepting requests. The ARM signal 22 being high also indicates that the target 12 will begin executing an accepted request at the start of the next clock cycle after it is accepted. After step 39, the method proceeds to step 40 where the target 12 determines whether the initiator 10 is asserting one of the REQ signals. An asserted REQ signal indicates a request for execution by the target 12 of the request corresponding to that REQ signal. If the initiator 10 is not asserting a request in step 40, then the method branches back to step 36. If the initiator 10 is asserting a request in step 40, then the method proceeds to step 42 where the target 12 accepts and begins executing the request at the beginning of the next clock cycle. After step 42 the method branches to step 36 to repeat the process.

In general, the present invention finds application in digital computer systems to facilitate the transfer of data between the microprocessor and other devices.

Figure 5:
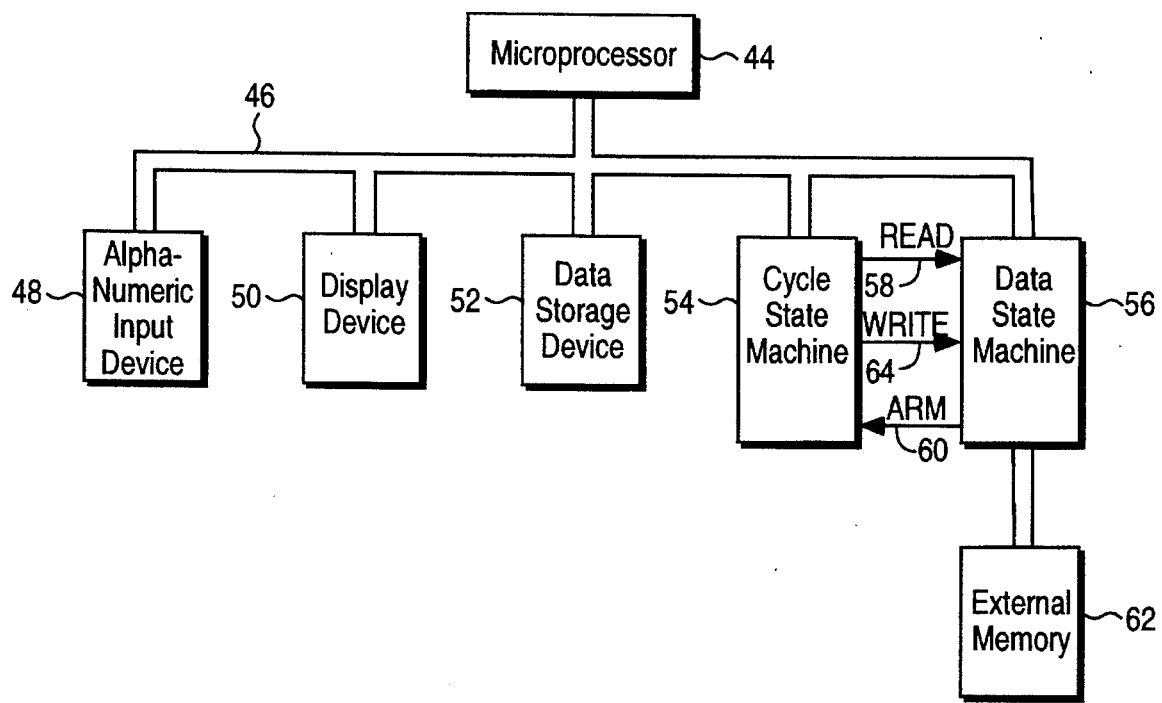
FIG. 5 is a block diagram of a computer system implementing the present invention.

Referring now to FIG. 5, a computer system incorporating the present invention is shown including a microprocessor 44, a cycle state machine 54, and a data state machine 56 all coupled to a system bus 46. The system bus comprises the address, data, and control lines necessary for transferring data between the various blocks of the system. An external memory 62 is coupled to the data state machine 56. An alphanumeric input device 48 for allowing a computer user to communicate information and commands to the microprocessor, a display device 50 for displaying information to the computer user, and a data storage device 52 such as a hard disk for storing information are also coupled to the system bus 46. It should be understood that not all of these components are necessary for a given computer system implementation. It should also be understood that additional components may be present in a given computer system.

In the computer system of FIG. 5, the present invention is implemented in the handshake protocol between the cycle state machine 54 and the data state machine 56. The cycle state machine 54 generates a READ signal 58 and a WRITE signal 64 for requesting read and write operations, respectively. The data state machine 56 receives the READ and WRITE signals and selectively executes the read and write operation, respectively. The data state machine 56 also generates an ARM signal 60 that is coupled to the cycle state machine 54.

In the computer system, the cycle state machine 54 and data state machine 56 cooperate via the handshaking protocol of the present invention to enhance the external memory read and write operation of the microprocessor. The cycle state machine 54 monitors the address and control data driven by the microprocessor 44 on the system bus 46 to determine if the microprocessor 44 needs to read data from or write data to the external memory 62. If a read cycle is detected then the cycle state machine 54 drives the READ signal 58 high. If a write data cycle is needed then the cycle state machine 54 drives the WRITE signal 64 high. Only one request signal is active at a time. The data state machine 56 will service the first request received after the ARM signal 60 is driven high, as previously described. If the ARM signal 0 is high when a request is first driven, then the cycle state machine 54 knows that the data state machine will accept and begin servicing that request at the start of the next clock cycle. Therefore, at the start of the next clock cycle the cycle state machine 54 is free to initiate another event gated by the start of the first request, such as a subsequent read or write request. The performance benefit provided by the present invention is that it allows the cycle state machine 54 to initiate another gated event one clock cycle earlier than prior art handshake protocols. This significantly increases the overall performance of the cycle and data state machines in servicing read and write requests by the microprocessor. In this manner, the present invention provides an overall performance advantage to the computer system.

To better understand the operation of the present invention in the computer system, consider the following example. Suppose that the microprocessor 44 needs to write data 5F5FH (hex) to address 8A5EH in the external memory 62. The microprocessor 44 drives address 8A5EH and the write control signals on the system bus 46. The cycle state machine 54 monitors the address and control information and detects that the microprocessor 44 needs to write date to the external memory 62. Suppose that the data state machine 56 is currently driving the ARM signal 60 high indicating that the data state machine 56 is accepting requests. The cycle state machine 54 drives the WRITE signal 64 high to indicate a write request. Since the ARM signal 60 is high when the WRITE signal 64 goes high, the cycle state machine 54 knows that data state machine 56 will begin executing the write request at the start of the next clock cycle. Suppose that the cycle state machine 54 must also indicate to the microprocessor 44 when the write request has begun so that the microprocessor 44 can then start executing another task. The handshake protocol of the present invention allows the cycle state machine 54 to initiate the other task by the microprocessor at the start of the clock cycle following the initial write request. This allows the microprocessor 44, or other unit that is gated by execution of the write request, to begin the gated task one clock cycle earlier than the request/acknowledge handshake protocol of the prior art.

Thus, a method and apparatus for streamlined handshaking between state machines has been described.

What is claimed is:

1. An apparatus having a streamlined handshake protocol, the apparatus comprising:

an initiator unit for generating a first signal for communicating a first request, the initiator unit also for receiving a second signal; and a target unit for receiving the first signal and a clock signal and selectively executing a first task in response to the first request, the target unit also for generating the second signal, the second signal having a first value for indicating the target unit will begin executing the first task a predetermined delay of at least one cycle of the clock signal after receiving the first request, the second signal having a second value for indicating that the target unit will not execute the first request.

2. The apparatus of claim 1 wherein the initiator unit and the target unit comprise state machines.

3. The apparatus of claim 1 wherein the initiator unit and the target unit comprise combinational logic state machines.

4. An apparatus having a streamlined handshake protocol, the apparatus comprising:

an initiator unit for generating a plurality of request signals for communicating a corresponding plurality of requests, the initiator unit for communicating only one active request at a time, the initiator unit also for receiving a second signal; and a target unit for receiving the plurality of request signals and clock signal and selectively executing the plurality of requests, the target unit also for generating the second signal, the second signal having a first value for indicating that the target unit will begin executing the active request a predetermined delay of at least one cycle of the signal after receiving the active request, the second signal having a second value for indicating that the target unit will not execute the active request.

5. The apparatus of claim 4 wherein the initiator unit and the target unit comprise state machines.

6. The apparatus of claim 4 wherein the initiator unit and the target unit comprise combinational logic state machines.

7. An apparatus having a streamlined handshake protocol, the apparatus comprising:

an initiator means for generating a first signal for communicating a first request, the initiator means also for receiving a second signal; and a target means for receiving the first signal and a clock signal and selectively executing a first task in response to the first request, the target means also for generating the second signal, the second signal having a first value for indicating that the target means will begin executing the first task a predetermined delay of at least one cycle of the clock signal after receiving the first request, the second signal having a second value for indicating that the target means will not execute the first request.

8. The apparatus of claim 7 wherein the initiator means and the target means comprise state machines.

9. The apparatus of claim 7 wherein the initiator means and the target means comprise combinational logic state machines.

10. An apparatus having a streamlined handshake protocol, the apparatus comprising:

an initiator means for generating a plurality of request signals for communicating a corresponding plurality of requests, the initiator means for communicating only one active request at a time, the initiator means also for receiving a second signal; and a target means for receiving the plurality of request signals and a clock signal and selectively executing the plurality of requests, the target means also for generating the second signal, the second signal having a first value for indicating that the target means will begin executing the active request a predetermined delay of at least one cycle of the clock signal after receiving the active request, the second signal having a second value for indicating that the target means will not execute the active request.

11. The apparatus of claim 10 wherein the initiator means and the target means comprise state machines.

12. The apparatus of claim 10 wherein the initiator means and the target means comprise combinational logic state machines.

13. A method of handshaking between an initiator state machine and a target state machine, the method comprising the steps of:

generating a request by the initiator state machine;

sending the request to the target state machine;

generating by the target state machine a handshake signal having either a first value or a second value, the first value indicating that the target state machine will begin executing a task a predetermined delay of at least one cycle of a clock signal after receiving the request, the second value indicating that the target state machine Will not execute the request: and receiving the handshake signal by the initiator state machine.

14. A computer system comprising:

a) a microprocessor; a system bus coupled to the microprocessor for providing a common communication pathway; an external memory; and b) an apparatus coupled between the system bus and the external memory for performing read and write operations to the external memory in response to the microprocessor, the apparatus comprising:

a cycle state machine for monitoring the system bus and generating a read request signal and a write request signal in response to the microprocessor, the cycle state machine for generating only one active request at a time, the cycle state machine also for receiving a second signal; and a data state machine for receiving the read request signal and the write request signal and a clock signal and selectively reading and writing data to the external memory in response to the active request, the data state machine also for generating the second signal, the second signal having a first value for indicating that the data state machine will begin executing the active request a predetermined delay of at least one cycle of the clock signal after receiving the active request, the second signal having a second value for indicating that the data state machine will not execute the active request.

15. A computer system comprising:

a) a microprocessor; a system bus coupled to the microprocessor for providing a common communication pathway; an external memory; and b) means coupled between the system bus and the external memory for performing read and write operations to the external memory in response to the microprocessor, the read/write means comprising:

cycle means for monitoring the system bus and generating a read request signal and write request signal in response to the microprocessor, the cycle means for generating only one active request at a time, the cycle means also for receiving a second signal; and data means for receiving the read request signal and the write request signal and a clock signal and selectively reading and writing data to the external memory in response to the active request, the data means also for generating the second signal, the second signal having a first value for indicating that the data state machine will begin executing the active request, a predetermined delay of at least one cycle of the clock signal after receiving the active request, the second signal having a second value for indicating that the data means will not execute the active request.

* * * * *

UNITED STATES PATENT AND TRADEMARK OFFICE
CERTIFICATE OF CORRECTION

PATENT NO. : 5,548,767
DATED : August 20, 1996
INVENTOR(S) : Brian K. Langendorf It is certified that error appears in the above-identified patent and that said Letters Patent is hereby corrected as shown below:

In column 4 at line 15 delete "FIG. 2*a*" and insert --FIG. 2*b*--

In column 6 at line 41 delete "0" and insert --60--

Signed and Sealed this

Fourth Day of March, 1997

BRUCE LEHMAN

*Attest:*

*Attesting Officer*     Commissioner of Patents and Trademarks